US007089734B2

(12) United States Patent
Cook et al.

(10) Patent No.: US 7,089,734 B2
(45) Date of Patent: Aug. 15, 2006

(54) HYDRAULIC SYSTEM FOR WHEELED LOADER

(75) Inventors: David Allan Cook, Staffordshire (GB); Ben Covell, Abbots Bromley (GB)

(73) Assignee: J.C. Bamford Excavators Limited, Staffordhire (GB)

( * ) Notice: Subject to any disclaimer, the term of this patent is extended or adjusted under 35 U.S.C. 154(b) by 0 days.

(21) Appl. No.: 09/866,311

(22) Filed: May 25, 2001

(65) Prior Publication Data

US 2002/0001516 A1 Jan. 3, 2002

(30) Foreign Application Priority Data

May 25, 2000 (GB) ................................ 0012602.9

(51) Int. Cl.
*F16D 31/02* (2006.01)

(52) U.S. Cl. .......................................... 60/469; 60/413

(58) Field of Classification Search .................. 91/420; 60/469, 413, 467
See application file for complete search history.

(56) References Cited

U.S. PATENT DOCUMENTS 3,866,700 A * 2/1975 Bauer .......................... 60/428

(Continued)

FOREIGN PATENT DOCUMENTS

DE 3909205 5/1990

(Continued)

OTHER PUBLICATIONS

*Teleporter Service Manual No. 505122*, Sanderson Teleporters 1994, A Division of Wordsworth Holdings PLC: pp. 7.3.1 to 7.3.3.

(Continued)

*Primary Examiner*—F. Daniel Lopez
(74) *Attorney, Agent, or Firm*—Marshall, Gerstein & Borun LLP

(57) ABSTRACT

An hydraulic system for a wheeled loader comprising a loader arm assembly which carries a working implement and which is connected to the body and which is movable between raised and lowered positions by means of a hydraulic ram means and in which a hydraulic accumulator is connected to the Hydraulic ram means wherein the loader arm assembly is connected at, or adjacent to, the rear end thereof to the body at, or adjacent to, the rear end thereof so that the loader arm assembly extends forwardly whereby, in a lowered position of the loader arm assembly, the working implement is disposed in front of the body wherein each chamber of the hydraulic ram means is connected to a selection valve means adapted to feed fluid under pressure to one chamber of the ram means and to receive fluid at a lower pressure from the other chamber of the ram means in order to raise the loader arm assembly or to feed fluid under pressure to said other chamber of the ram means and receive fluid at a lower pressure from said one chamber of the ram means to lower the loader arm assembly, first and second control valves each of which is movable between a first position in which passage of hydraulic fluid therethrough is prevented in one or both directions respectively to a second position in which passage of hydraulic fluid therethrough is permitted, said first control valve means being connected between said first chamber and said accumulator and said second valve means being connected between said second chamber and a low pressure region and there being a check valve connected between the first chamber and the selection valve means such that the check valve is normally closed to prevent fluid under pressure passing from said first chamber to the selection valve means and having hydraulic fluid responsive means to open said check valve and there being means to connect said hydraulic fluid pressure means to said second chamber so as to open the check valve.

14 Claims, 6 Drawing Sheets

U.S. PATENT DOCUMENTS

| | | | | |
|---|---|---|---|---|
| 4,522,109 | A * | 6/1985 | Marchi et al. | 91/420 |
| 4,658,970 | A | 4/1987 | Oliphant | |
| 4,953,723 | A | 9/1990 | Saotome et al. | |
| 4,969,562 | A | 11/1990 | Saotome | |
| 4,995,517 | A | 2/1991 | Saotome | |
| 5,007,544 | A | 4/1991 | Saotome et al. | |
| 5,034,892 | A | 7/1991 | Saotome | |
| 5,195,864 | A | 3/1993 | Drake et al. | 60/469 |
| 5,513,491 | A | 5/1996 | Broenner et al. | 60/469 |
| 5,706,657 | A | 1/1998 | Amborski et al. | |
| 6,357,230 | B1 * | 3/2002 | A'Hearn et al. | 60/413 |

FOREIGN PATENT DOCUMENTS

| | | | |
|---|---|---|---|
| DE | 42 21 943 | A1 | 3/1993 |
| DE | 197 34 658 | A1 | 2/1999 |
| DE | 199 31 027 | A1 | 2/2000 |
| DE | 19913784 | | 9/2000 |
| EP | 0388641 | | 9/1990 |
| EP | 482248 | A1 | 4/1992 |
| EP | 0 483 393 | A1 | 5/1992 |
| EP | 1003939 | | 5/2000 |
| GB | 2090811 | | 7/1982 |
| GB | 2 327 076 | A | 1/1999 |
| GB | 2357319 | | 6/2001 |
| JP | 58121305 | | 7/1983 |
| JP | 59-073602 | | 4/1984 |
| JP | 63265023 | | 11/1988 |
| JP | 64-066321 | | 3/1989 |
| JP | 1066324 | | 3/1989 |
| JP | 01-256494 | | 10/1989 |
| JP | 03-036194 | | 2/1991 |
| JP | 03-036195 | | 2/1991 |
| JP | 5163745 | | 6/1993 |
| JP | 9078633 | | 3/1997 |
| WO | WO90/05814 | | 5/1990 |
| WO | WO-95/08715 | | 3/1995 |
| WO | WO 99/07950 | | 2/1999 |

OTHER PUBLICATIONS

*European Standard EN1459*; "Safety of Industrial Trucks-Self-Propelled Variable Reach Trucks," European Committee for Standardization: Text Ratified Nov. 27, 1998; 12 pages.

Mannesmann Rexroth, *Stabilising Module For Wheel Loaders Type MHRSM. . . Series 2X*, Jul. 1996, 8 pages, England.

CASE, *Chargeuses Pelleteuses*, Jun. 1997, 8 pages, France.

CASE, *580 Ranger*, Date Unknown, 4 pages, France.

CASE, *Ride Control*, Oct. 1996, 2 pages, France.

CASE, *L Series 2, Loader/Backhoes*, Mar. 1999, 30 pages, USA.

CASE, *Technical Validation Report*, Mar. 1996, 7 pages, France.

FLUTEC, *Senkbrems-sperrventile SBV*, Jul. 1986, 4 pages, Germany.

*Gute Aussichten*, Profi, Sep. 1997, 4 pages, Germany.

* cited by examiner

HYDRAULIC SYSTEM FOR WHEELED LOADER

BACKGROUND OF THE INVENTION

This invention relates to a hydraulic system for a wheeled loader having a loader arm assembly which carries a working implement and in which the loader arm assembly is connected to the body and which is movable between raised and lowered positions by means of a hydraulic ram means.

It is known to improve the ride of such a wheeled loader by connecting an hydraulic accumulator into the hydraulic hose which feeds hydraulic fluid into said ram means to raise the loader arm assembly. As a result when the wheeled loader is travelling across a site, or when travelling along a road, at speed the loader arm assembly is suspended in spring manner by the accumulator and so the wheeled loader is able to travel with less pitch and bounce than would otherwise have been the case.

However, such a ride improvement system has not been provided hitherto in a loader vehicle comprising a loader arm assembly connected at, or adjacent to, the rear end of the assembly to the body at, or adjacent to, the rear end of the body so that the loader arm assembly extends forwardly whereby, in a lowered position of the arm assembly, the working implement is disposed in front of the body. Such a vehicle is provided with a hose burst check valve.

According to the present we provide an hydraulic system for a wheeled loader having a loader arm assembly which carries a working implement and which is connected to the body and which is movable between raised and lowered positions by means of a hydraulic ram means and in which a hydraulic accumulator is connected to the hydraulic ram means wherein the loader arm assembly is connected at, or adjacent to, the rear end thereof to the body at, or adjacent to, the rear end thereof so that the loader arm assembly extends forwardly whereby, in a lowered position of the loader arm assembly, the working implement is disposed in front of the body wherein each chamber of the hydraulic ram means is connected to a selection valve means adapted to feed fluid under pressure to one chamber of the ram means and to receive fluid at a lower pressure from the other chamber of the ram means in order to raise the loader arm assembly or to feed fluid under pressure to said other chamber of the ram means and receive fluid at a lower pressure from said one chamber of the ram means to lower the loader arm assembly, first and second control valves each of which is movable between a first position in which passage of hydraulic fluid therethrough is prevented in one or both directions respectively to a second position in which passage of hydraulic fluid therethrough is permitted, said first control valve means being connected between said first chamber and said accumulator and said second control valve means being connected between said second chamber and a low pressure region and there being a check valve connected between the first chamber and the selection valve means such that the check valve is normally closed to prevent fluid under pressure passing from said first chamber to the selection valve means and having hydraulic fluid responsive means to open said check valve and there being means to connect said hydraulic fluid pressure means to said second chamber so as to open the check valve.

The selection valve may be manually operable.

The control valves may be electrically operated solenoid valves to which current is supplied by a manually operable switch means to cause operation of said ride improvement means when said valves are positioned to permit passage of hydraulic fluid.

The selection valve may be provided with a switch means to sense the position of the selection valve to close said second control valve when the boom is lowered and said control valves are open.

The accumulator and the control valves and the check valves may be mounted directly on the ram.

At least one of said accumulator, solenoid valves, check valves and connecting pipework may be made in metal, preferably steel.

Said check valve may be a hose burst check valve.

Said one chamber may be disposed on the opposite side of the valve to the piston rod and said other chamber may be an annular chamber surrounding said piston rod.

BRIEF DESCRIPTION OF THE DRAWINGS

An example of the invention will now be described with reference to the accompanying drawings wherein.

Figure 1:
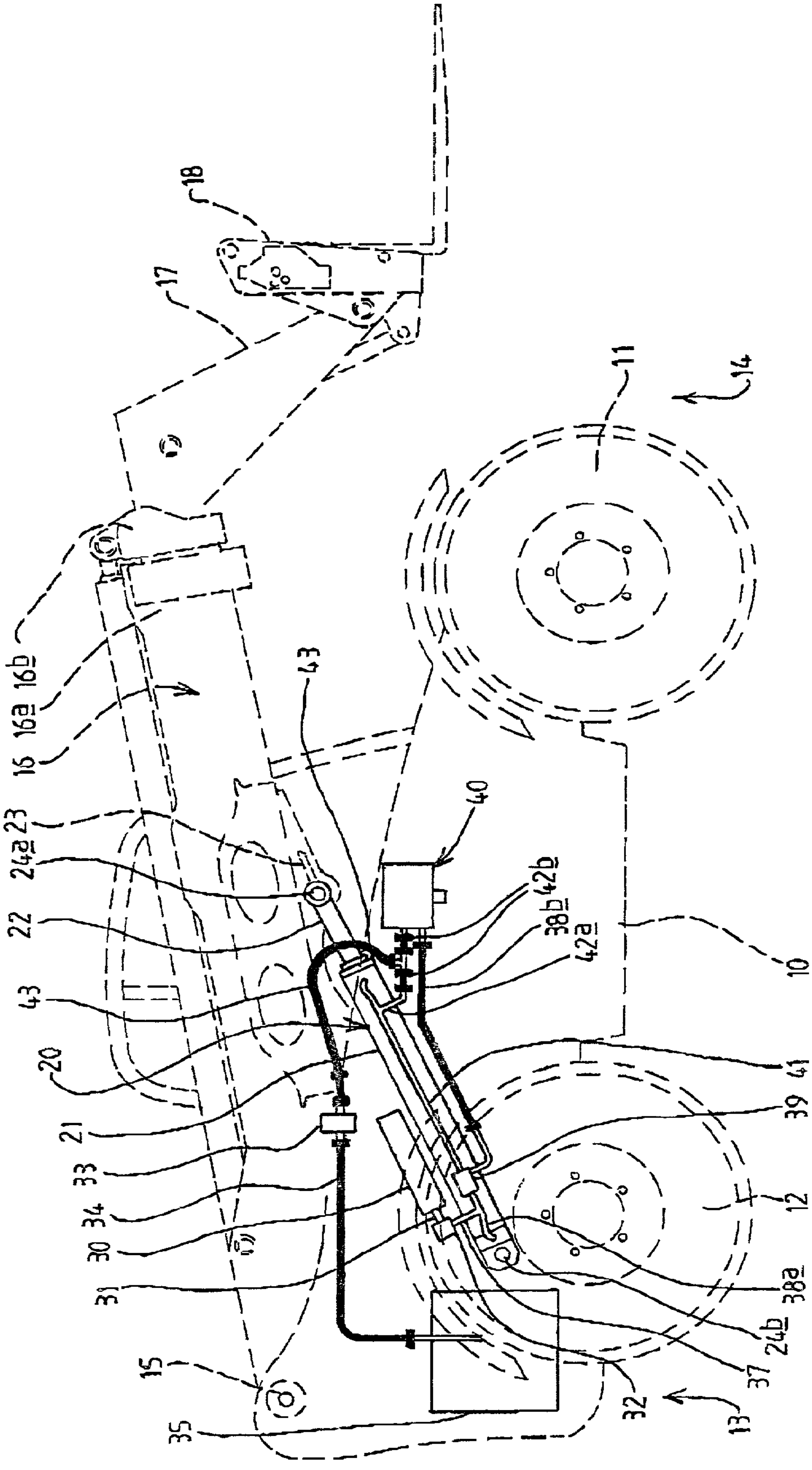
FIG. 1 is a side view of a vehicle according to the invention.

Referring to the drawings, a wheeled loader vehicle comprises a body 10 supported, in conventional manner, on two pairs of front and rear wheels 11, 12 each of which is steerable and each of which is driven by a suitable transmission and differential means from an engine which may be disposed as desired on the vehicle. The body 10 has a rear end 13 and a front end 14. A loader arm assembly 16, at a position adjacent its rear end, is pivotally mounted to the body 10 adjacent the rear end 13 of the body, about an axis 15. The loader arm assembly 16 in the present example, is a two part boom having an outer part 16*a*, within which is telescoped an inner part 16*b* and which parts are slidable relative to each other by hydraulic ram means so as to provide an extendible loader arm assembly. If desired the vehicle may have a two or more part boom or an unextendible single part boom.

At the front end of the boom assembly 16 is a downwardly extending nose part 17 by which a working implement 18 is releasably carried in conventional manner. If desired, the working implement 18 may be a pair of lifting tines as shown or may be a bucket or any other suitable working implement.

The loader arm assembly may be connected to the body at or adjacent the rear thereof, by any suitable pivot means disposed at or adjacent the rear of the loader arm assembly.

The loader arm assembly 16 is pivotable about the axis 15 between raised and lowered positions. In the lowered position working implement 18 is disposed in front of the vehicle front end 14. The loader arm assembly 16 is movable between said raised and lowered positions by a ram assembly 20, which in the present example comprises a single ram.

The rams assembly 20, in conventional manner, comprises a cylinder part 21 and a piston rod 22. The piston rod 22 is connected at one end to a bracket 23 depending downwardly from the underside of the part 16*a* of the lowered arm assembly by means of a pivot pin 24*a* whilst the cylinder 21 is connected, at its lower end, by a pivot pin 24*b* to a part of the body 10. Obviously extension and retraction of the piston rod 22 from the cylinder 21 causes pivotal raising and lowering of the arm assembly 16.

Within the cylinder 21 is a first chamber 25, on one side of the piston 27, which is of cylindrical configuration and a second chamber 26 on the opposite side of the piston 27, see FIGS. 2 to 5, to the first chamber 25 and which is of annular configuration in cross section. Mounted on the cylinder 21 is a conventional accumulator means 30 made of, in the present example, steel and connected by a pipe 31 to a first control valve 32. A second control valve 33 is connected by a line 34 comprising flexible hoses and/or rigid pipes to an hydraulic reservoir or other low pressure area 35.

Each control valve 32, 33 is an electrically operated solenoid valve and which is movable between a first or "at rest" position in which passage of fluid is prevented in one direction of the valve 32 and in both directions in the valve 33 and a second position in which passage of fluid is permitted. Both control valves 32, 33 are normally spring biased by a spring means 36 to the position in which flow of fluid is prevented as illustrated in FIG. 2 and FIG. 3.

A line 38, comprising a rigid pipe 38*a* and a flexible line 38*b*, corrects the first chamber 25 of the ram 20 to a fist port 40*a* of a selection valve 40 via a hose burst check valve 39. The first control valve 32 is connected by a line 37, comprising a rigid pipe, to the line 38 between ram chamber 25 and the hose burst check valve 39. The hose burst check valve 39 is a pilot valve that is normally maintained closed in the direction to prevent flow of fluid under pressure from the chamber 25 to the valve 40 but it may be opened by supply of pilot pressure on line 41, comprising a rigid pipe, from a line 42, comprising a rigid pipe 42*a* and flexible hoses 42*b* which extends between a second port 40*b* of the selection valve 40 and the chamber 26 of the ram 20. The line 42 is connected by a line 43 to the second control valve 33.

Figure 2:
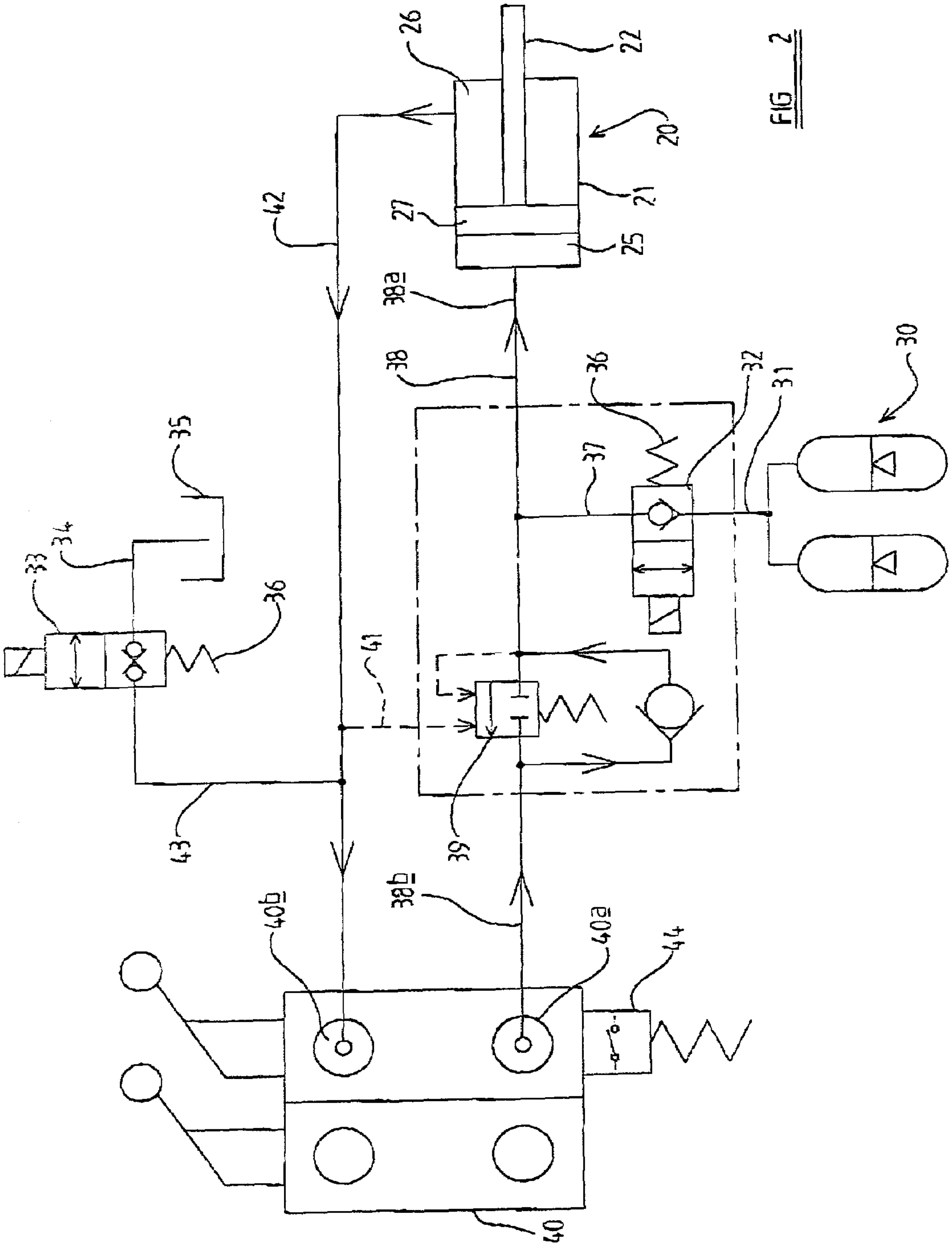
FIG. 2 is a diagrammatic circuit diagram showing the flow of hydraulic fluid and valve positions in normal operation of the vehicle during lifting of the arm.

In use, as best shown in FIG. 2, during normal operation, when it is desired to lift the arm, fluid under pressure is fed from the first port 40*a* of the selection valve 40 along the line 38 through the one-way check valve within the hose burst check valve 39. As boom suspension has not been selected there is no electrical supply to valves 32 and 33 and they remain in the normally closed position. As the telescopic boom 16 is raised, by the supply of fluid to the chamber 25, fluid under lower pressure is fed from the chamber 26 along line 42 into a port 40*b* of the selection valve 40. The valve 33, of course, being, like the valve 32, maintained in the position shown in FIG. 2 to prevent flow of fluid therethrough by virtue of no electrical supply being supplied to the solenoid thereof.

Figure 3:
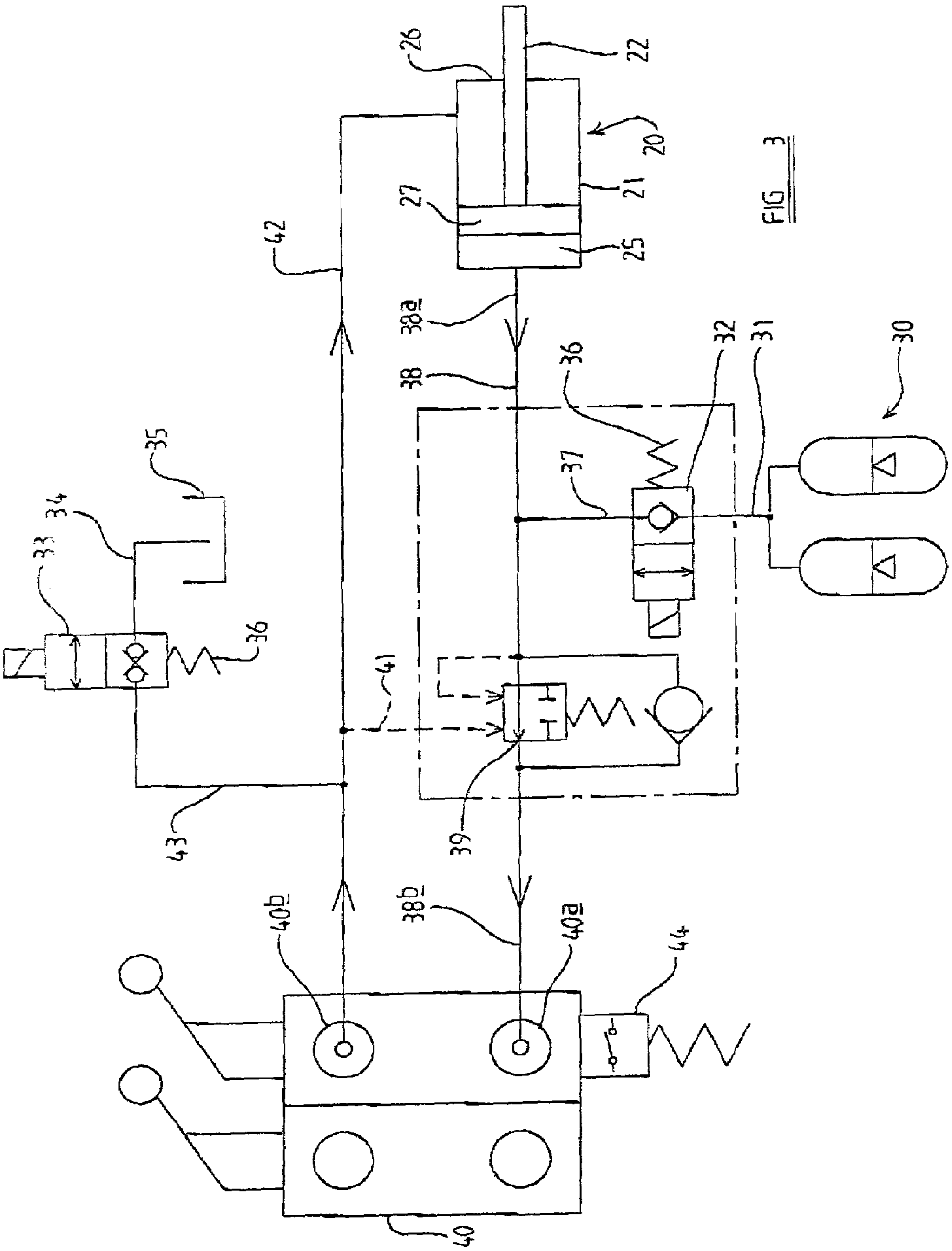
FIG. 3 is a view similar to that of FIG. 2 but showing normal operation during lowering of the arm.

Referring now to FIG. 3, when it is desired to lower the loader arm assembly the valve 40 is actuated to feed fluid under pressure through port 40*b* along line 42 into the chamber 26 and thus fluid under lower pressure is fed from chamber 25 along line 38 through hose burst check valve 39 which is maintained in an open position by virtue of supply of pilot pressure on line 41 which extends from line 42.

Figure 4:
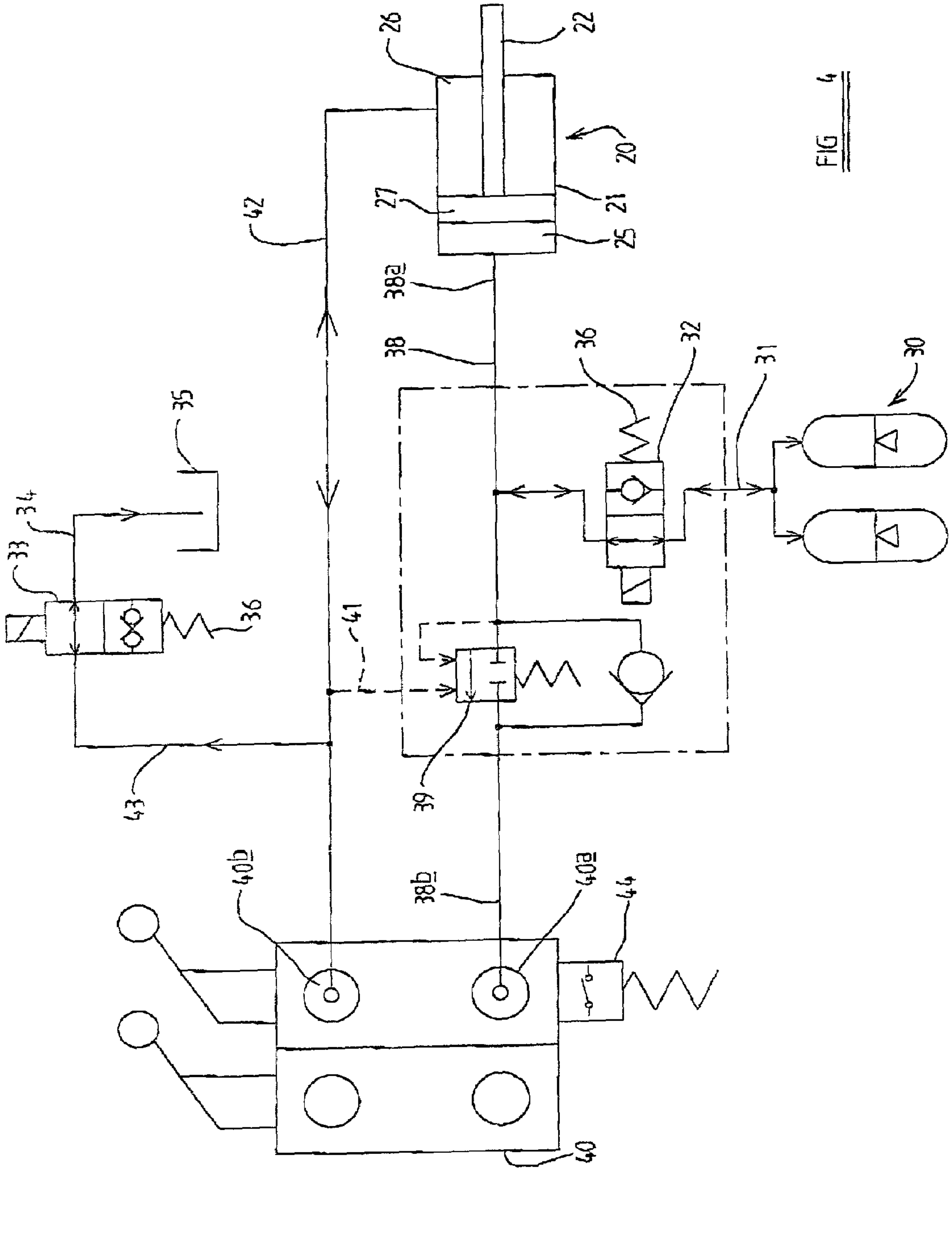
FIG. 4 is a view similar to that of FIG. 2 but showing a travel position of the vehicle with the ride improvement means engaged.
Figure 5:
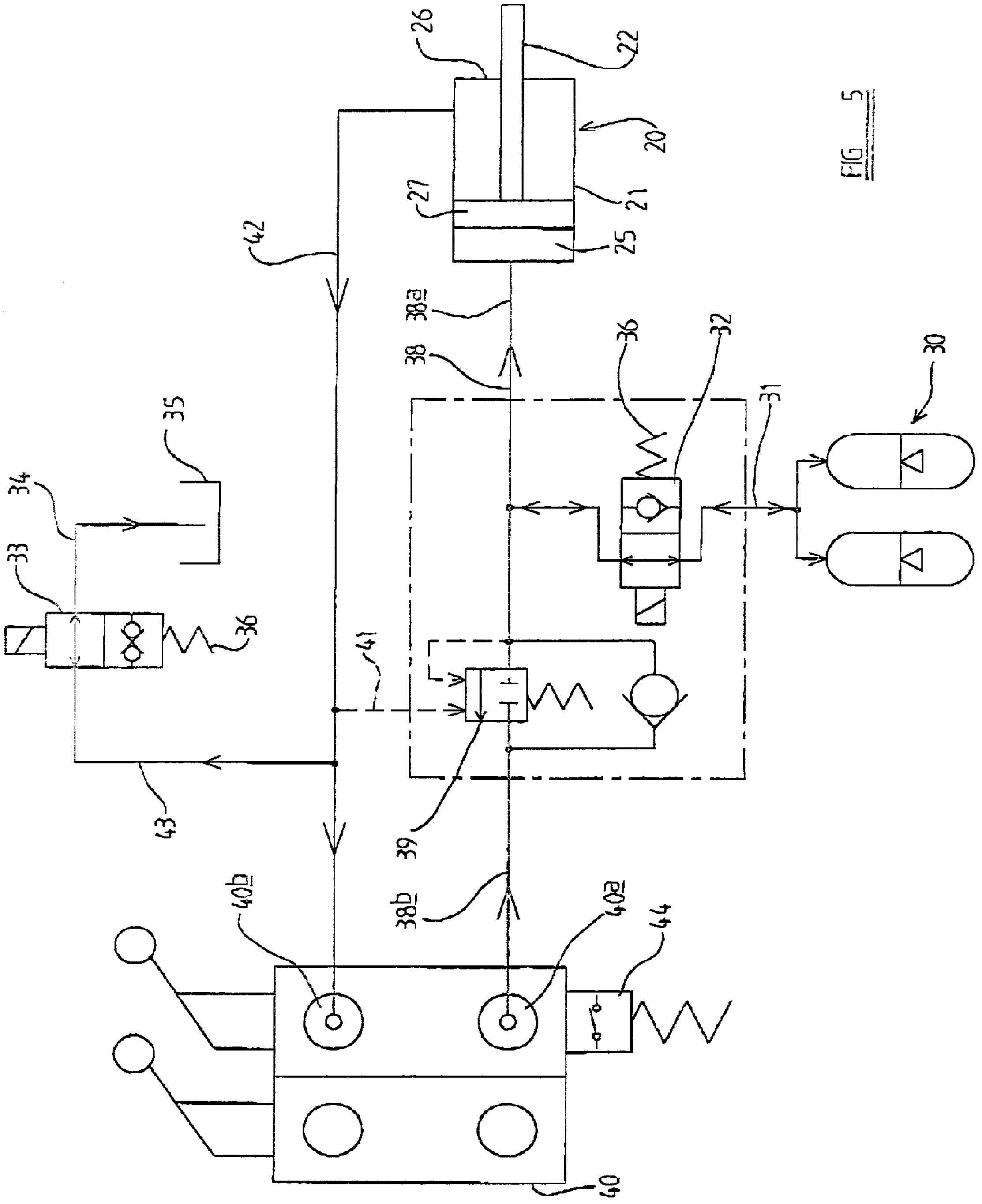
FIG. 5 is a view similar to that of FIG. 4 but showing a boom lift position and ride improvement means engaged.
Figure 6:
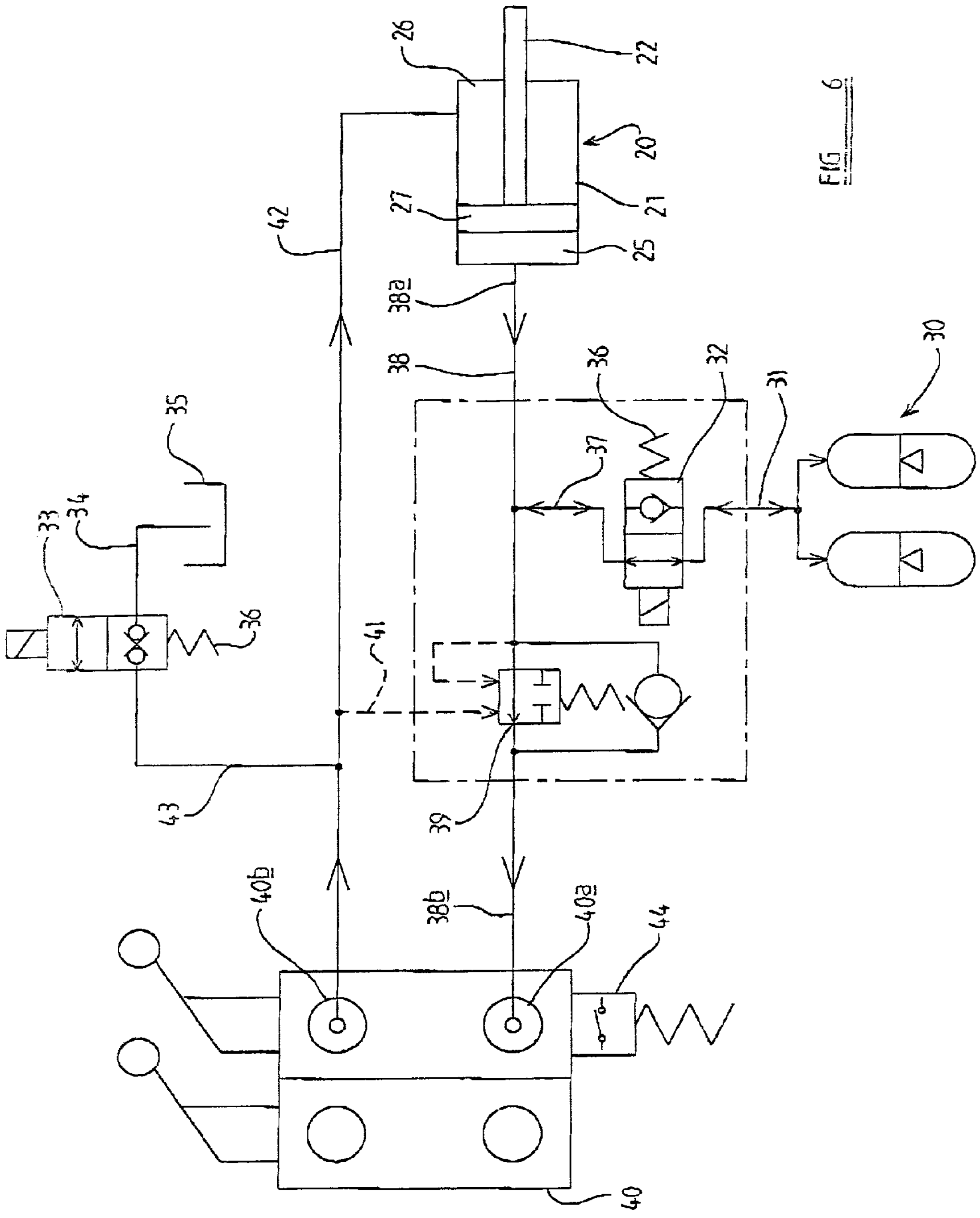
FIG. 6 is a view similar to that of FIG. 4 but showing flow of fluid in a boom lower position with the ride improvement means engaged.

Referring now to FIG. 4, when it is desired to operate the ride improvement means i.e. boom suspension means the system is activated by operation of a suitable electric control so that electrical supply is provided to the valves 32, 33 to move them from the positions shown FIGS. 2 and 3 to the positions shown in FIGS. 4 to 6 in which passage of hydraulic fluid is permitted.

In this position fluid can flow both to the accumulator 30 and also to the reservoir 35 in accordance with the external forces imposed on the piston 27 to displace fluid to or from chambers 25, 26. Such a condition is shown in FIG. 4. As a result the loader arm is supported by the action of the accumulator on the hydraulic fluid and it is, in effect, sprung.

Referring now to FIG. 5, when it is desired to raise the loader arm assembly whilst the ride improvement means is engaged, the valve 40 is actuated to feed fluid from port 40*a* under pressure along line 38 into the chamber 25 whilst fluid from the chamber 26 passes along the line 42 back to the valve 40. At the same time the suspension of the arm assembly is suspended by the accumulator 30 as described hereinbefore in connection with the FIG. 4.

Referring now to FIG. 6, when it is desired to lower the boom whilst the ride improvement means is engaged, the actuation of the valve 40 to raise pressure at port 40*b*, by virtue of switch 44, has the effect of collapsing the electrical signal to valve 33 which becomes closed and so allows pressure to be raised in line 42 which feeds fluid under pressure to chamber 26, whilst fluid in chamber 25 is fed via line 38 through the hose burst check valve 39 to the port 40*a* of the valve 40. The hose burst check valve 39 is maintained open by pilot pressure fluid on line 41 which extends from line 42.

Whilst in his example the accumulator 30, valves 32, 33 and check valve 39 are all disposed on the cylinder 21, if desired one or more or these components may be positioned as desired and made of material as desired where permitted by local regulations.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result as appropriate, may, separately, or in any combination of such features, be utilised for realising the invention in diverse forms thereof.

The invention claimed is:

1. An hydraulic system for a wheeled loader having a loader arm assembly which carries a working implement and which is connected to the body and which is movable between raised and lowered positions by means of a hydraulic actuator device and in which a hydraulic accumulator is connected to the hydraulic actuator device wherein the loader arm assembly is connected at, or adjacent to, the rear end thereof to the body at, or adjacent to, the rear end thereof so that the loader arm assembly extends forwardly whereby, in a lowered position of the loader arm assembly, the working implement is disposed in front of the body and wherein the actuator device includes a cylinder receiving a piston, the cylinder having a first chamber at one side of the piston and a second chamber at a second side of the piston, each chamber of the cylinder being connected to a selection valve means adapted to feed fluid under pressure to the first chamber of the cylinder via a first feed line and to receive fluid at a lower pressure from the second chamber of the cylinder via a second feed line in order to raise the loader arm assembly or to feed fluid under pressure to the second chamber of the cylinder via the second feed line and receive fluid at a lower pressure from the first chamber of the cylinder via the first feed line to lower the loader arm assembly, first and second control valves, the first control valve movable between a first position in which passage of hydraulic fluid is permitted only from the hydraulic accumulator toward the first chamber, and a second position in which passage of hydraulic fluid is permitted in two directions between the hydraulic accumulator and the first chamber, the second control valve movable between a first position in which passage of hydraulic fluid therethrough is prevented in both directions and a second position in which passage of hydraulic fluid therethrough is permitted in both directions, the first control valve being connected between the first chamber and the hydraulic accumulator and the second control valve being connected between the second chamber and a low pressure region, and there being a check valve assembly connected between the first chamber and the selection valve means, the first control valve in fluid communication with the first feed line at a point between the first chamber and the check valve assembly, the check valve assembly including a first component arranged to prevent fluid under pressure from passing from the first chamber to the selection valve means but permitting fluid under pressure to pass from the selection valve means to the first chamber, the check valve assembly including a second component arranged to prevent the passage of hydraulic fluid in both directions, the second component responsive to hydraulic fluid pressure increases in the second chamber to open the check valve to permit fluid flow from the first chamber to the selection valve means when the second chamber is pressurized; and a ride improvement means, the ride improvement means activated by selectively shifting the first and second control valves to their respective first and second positions, the first and second control valves when in the second position arranged to route hydraulic fluid to and from the accumulator in response to pressure changes in the first chamber and to and from the low pressure area in response to a pressure changes in the second chamber, the ride improvement means arranged to permit raising of the loader arm assembly when the first and second control valves are in the second position, the ride improvement means further arranged to permit lowering of the loader arm assembly when the first control valve is in the second position and the second control valve is in the first position.

2. A system according to claim 1 wherein the selection valve is manually operable.

3. A system according to claim 2 wherein the selection valve is provided with a switch means to sense the position of the selection valve to close said second control valve when the arm is lowered and said first control valve is open.

4. A system according to claim 1 wherein the control valves are electrically operated solenoid valves to which current is supplied by a manually operable switch means.

5. A system according to claim 1 wherein the accumulator and the control valves and the check valve assembly are mounted directly on the cylinder.

6. A system according to claim 1 wherein at least one of said accumulator, control valves, check valve assembly and connecting pipes are made of metal.

7. A hydraulic system having a ride improvement mode and for use on a wheeled loader having a forwardly extending loader arm assembly mounted adjacent a rear end of the wheeled loader, the hydraulic system comprising:

a hydraulic cylinder operatively connected to the loader arm for raising and lowering the loader arm, the hydraulic cylinder having a first chamber and a second chamber disposed on opposite sides of a piston;

a selection valve operatively connected to the hydraulic cylinder via a first line and a second line, the selection valve arranged to feed pressurized hydraulic fluid to the first chamber via the first line and to receive hydraulic fluid at a lower pressure from the second chamber via the second line in order to raise the loader arm assembly, the selection valve further arranged to feed pressurized hydraulic fluid to the second chamber via the second line and to receive hydraulic fluid at a lower pressure from the first chamber via the first line in order to lower the loader arm assembly;

an accumulator connected to the first feed line via a first control valve, the first control valve movable between a first position in which hydraulic fluid flow is permitted only from the accumulator to the first feed line and a second position in which hydraulic fluid flow is permitted between the accumulator and the first feed line in both directions;

a low pressure area connected to the second feed line by a second control valve, the second control valve movable between a first position in which passage of hydraulic fluid between the second feed line and the low pressure area is prevented in both directions and a second position in which hydraulic fluid flow between the second feed line and the low pressure area is permitted in both directions; and a check valve assembly operatively connected to both the first and second feed lines, the check valve assembly having a first mode in which hydraulic fluid flow is permitted in only a single direction, the single direction from the selection valve means to the first chamber, the check valve assembly having a second mode in which hydraulic fluid flow is permitted from the first chamber toward the selection valve, the check valve assembly arranged to respond to pressure in the second feed line to open the first feed line between the hydraulic cylinder and the selection valve;

the first and second control valves when both shifted to the second positions arranged to provide a hydraulic suspension to the loader arm assembly, the hydraulic suspension arranged to provide hydraulic fluid flow between the first chamber and the hydraulic accumulator in response to pressure changes in the first chamber, the hydraulic suspension further arranged to provide hydraulic fluid flow between the second chamber and the low pressure area in response to pressure changes in the second chamber, the first and second control valves and the check valve assembly cooperating to permit raising of the loader arm assembly when the first and second control valves are in the second position, the first and second control valves and the check valve assembly further cooperating to permit lowering of the loader arm assembly when the first control valve is in the-second position and the second control valve is in the first position.

8. A hydraulic system having a ride improving hydraulic circuit and for use on a wheeled loader having a forwardly extending loader arm assembly mounted adjacent a rear end of the wheeled loader, the hydraulic system comprising:

a hydraulic cylinder operatively connected to the loader arm for raising and lowering the loader arm, the hydraulic cylinder having a first chamber and a second chamber disposed on opposite sides of a piston;

a selection valve operatively connected to the hydraulic cylinder via a first line and a second line, the selection valve arranged to feed pressurized hydraulic fluid to the first chamber via the first line and to receive hydraulic fluid at a lower pressure from the second chamber via the second line in order to raise the loader arm assembly, the selection valve further arranged to feed pressurized hydraulic fluid to the second chamber via the second line and to receive hydraulic fluid at a lower pressure from the first chamber via the first line in order to lower the loader arm assembly;

an accumulator connected to the first feed line via a first control valve, the first control valve movable between a first position in which hydraulic fluid flow is permitted in only a single direction from the accumulator to the first chamber and a second position in which hydraulic fluid flow is permitted between the accumulator and the first chamber in both directions;

a low pressure area connected to the second feed line by a second control valve, the second control valve movable between a first position in which passage of hydraulic fluid between the second feed line and the low pressure area is prevented in both directions and a second position in which hydraulic fluid flow between the second feed line and the low pressure area is permitted in both directions; and a hose burst check valve assembly disposed in the first feed line between the first chamber and the selection valve, the first control valve intersecting the first feed line between the check valve assembly and the first chamber, the check valve assembly having a first mode arranged to prevent fluid under pressure passing from the first chamber to the selection valve but permitting fluid under pressure to flow from the selection valve to the first chamber, the check valve assembly having a second mode arranged to permit fluid flow from the first chamber toward the selection valve, the check valve assembly arranged to shift to the second mode in response to a pressure increase in the second chamber to open the check valve assembly to permit fluid flow from the first chamber to the selection valve when the second chamber is pressurized, the check valve assembly arranged to cooperate with the first and second control valves to provide a ride improving mode activated upon shifting both the first and second control valves to the second position to route hydraulic fluid between the first chamber and the accumulator via the first control valve and between the second chamber and the low pressure area via the second control valve, the check valve assembly further arranged to permit raising of the loader arm assembly when the first and second control valves are both in the second position.

9. The device of claim 8, wherein the check valve assembly is further arranged to permit lowering of the loader arm assembly when in the ride improving mode, the ride improving mode further including the second control valve shifted back to the first position when lowering the loader arm assembly.

10. A ride improving hydraulic circuit for a loader arm of a wheeled loader, the hydraulic circuit comprising:

a hydraulic cylinder operatively connected to the loader arm for raising and lowering the loader arm, the hydraulic cylinder having a first chamber and a second chamber disposed on opposite sides of a piston;

a selection valve operatively connected to the hydraulic cylinder via a first line and a second line, the selection valve arranged to feed pressurized hydraulic fluid to the first chamber via the first line and to receive hydraulic fluid at a lower pressure from the second chamber via the second line in order to raise the loader arm, the selection valve further arranged to feed pressurized hydraulic fluid to the second chamber via the second line and to receive hydraulic fluid at a lower pressure from the first chamber via the first line in order to lower the loader arm;

a valve assembly disposed in the first line between the first chamber and the selection valve, the valve assembly including a check valve arranged to prevent fluid under pressure passing from the first chamber to the selection valve but permitting fluid under pressure to flow from the selection valve to the first chamber, the valve assembly including a relief valve shiftable from a first position to a second position, the first position arranged to prevent fluid flow between the selection valve and the first chamber in both directions, the second position arranged to permit fluid flow from the first chamber toward the selection valve, the valve assembly arranged to shift to the second position in response to a pressure increase in the second chamber;

an accumulator operatively coupled to the first line by a first control valve, the first control valve in flow communication with the first line at a point between the valve assembly and the first chamber, the first control valve movable between a first position in which hydraulic fluid flow is permitted in only a single direction from the accumulator to the first chamber and a second position in which hydraulic fluid flow is permitted between the accumulator and the first chamber in both directions;

a low pressure area operatively coupled to the second line by a second control valve, the second control valve movable between a first position in which passage of hydraulic fluid between the second line and the low pressure area is prevented in both directions and a second position in which hydraulic fluid flow between the second feed line and the low pressure area is permitted in both directions; and a ride improving circuit, the ride improving circuit arranged to permit fluid flow in both directions between the accumulator and the first chamber when the first control valve is in the second position and further arranged to permit fluid flow in both directions between the second chamber and the low pressure region when the second control valve is in the second position, the first and second chambers hydraulically isolated from each other when both the first and second control valves are in the second position, and wherein the check valve and the relief valve are arranged to permit the loader arm to be raised when the relief valve is in the first position and both control valves are in the second position, and further wherein the check valve and the relief valve are arranged to permit the loader arm to be lowered when the first control valve and the relief valve are in the second position and the second control valve is in the first position, the relief valve arranged to shift to the second position upon pressurization of the second chamber when lowering the loader arm.

11. A ride improving hydraulic circuit for a loader arm of a loader and having hose burst protection, the hydraulic circuit comprising:

a hydraulic cylinder operatively connected to the loader arm for raising and lowering the loader arm, the hydraulic cylinder having a first chamber and a second chamber disposed on opposite sides of a piston;

a selection valve operatively connected to the hydraulic cylinder via a first line and a second line, the selection valve arranged to feed pressurized hydraulic fluid to the first chamber via the first line and to receive hydraulic fluid at a lower pressure from the second chamber via the second line in order to raise the loader arm, the selection valve further arranged to feed pressurized hydraulic fluid to the second chamber via the second line and to receive hydraulic fluid at a lower pressure from the first chamber via the first line in order to lower the loader arm;

a hose burst check valve operatively coupled to the hydraulic cylinder via a rigid pipe connection and coupled to the first line at a first point and a second point, the hose burst check valve operatively coupled to the first chamber by the rigid pipe connection and providing hose burst protection between the check valve and the selection valve, the hose burst check valve arranged to prevent fluid under pressure from passing from the first chamber toward the selection valve but permitting fluid under pressure to flow from the selection valve toward the first chamber;

a relief valve disposed in the first line between the first point and the second point, the relief valve shiftable from a first position to a second position in response to pressure changes in the second line, the first position arranged to prevent fluid flow between the selection valve and the first chamber in both directions, the second position arranged to permit fluid flow from the first chamber toward the selection valve, the relief valve arranged to shift to the second position in response to a pressure increase in the second chamber;

an accumulator mounted to the hydraulic cylinder and operatively coupled to the hydraulic cylinder;

a first control valve disposed in the first line and connected to both the accumulator, and the first chamber, the first control valve in flow communication with the first feed line between the hose burst protection valve and the first chamber, the first control valve movable between a first position in which hydraulic fluid flow is permitted in only a single direction from the accumulator to the first chamber and a second position in which hydraulic fluid flow is permitted between the accumulator and the first chamber in both directions;

a low pressure area;

a second control valve operatively connecting the second line to the low pressure area, the second control valve movable between a first position in which hydraulic fluid flow between the second line and the low pressure area is prevented in at least one direction and a second position in which hydraulic fluid flow between the second feed line and the low pressure area is permitted in both directions;

the first control valve, the second control valve, and the hose burst protection valve cooperating to provide a ride improving circuit having an active and inactive configuration, the ride improving circuit arranged to permit raising and lowering the loader arm while the ride improving circuit is active and when the ride improving circuit is inactive;

the active configuration arranged to permit raising the loader arm by shifting each of the control valves to the second position with the relief valve biased toward the first position; and the active configuration further arranged to permit lowering the loader arm by shifting the first control valve to the second position and the second control valve to the first position, the relief valve shiftable toward the second position in response to pressure increases in the second line.

12. The hydraulic circuit of claim 11, including a sensor switch operatively, coupled to the selection valve and the second control valve, the sensor switch arranged to sense the position of the selection valve and to close the second control valve when the second chamber is being pressurized.

13. A ride improving hydraulic circuit for a loader arm of a loader and having hose burst protection, the hydraulic circuit comprising:

a hydraulic cylinder operatively connected to the loader arm for raising and lowering the loader arm, the hydraulic cylinder having a first chamber and a second chamber disposed on opposite sides of a piston;

a selection valve operatively connected to the hydraulic cylinder via a first line and a second line, the selection valve arranged to feed pressurized hydraulic fluid to the first chamber via the first line and to receive hydraulic fluid at a lower pressure from the second chamber via the second line in order to raise the loader arm, the selection valve further arranged to feed pressurized hydraulic fluid to the second chamber via the second line and to receive hydraulic fluid at a lower pressure from the first chamber via the first line in order to lower the loader arm;

a hose burst protection valve operatively coupled to the hydraulic cylinder and disposed in the first line, the hose burst protection valve operatively coupled to the first chamber by a rigid pipe connection disposed in the first line, the hose burst protection valve comprising a check valve arranged to prevent fluid under pressure from passing from the first chamber toward the selection valve but permitting fluid under pressure to flow from the selection valve toward the first chamber;

the hose burst protection valve further comprising a relief valve shiftable from a first position to a second position and connected to the second chamber by a connection, the first position arranged to prevent fluid flow between the selection valve and the first chamber in both directions, the second position arranged to permit fluid flow from the first chamber toward the selection valve, the relief valve arranged to shift to the second position in response to a pressure increase in the second chamber;

an accumulator mounted to the hydraulic cylinder and operatively coupled to the hydraulic cylinder by a connection;

a first control valve disposed in the first line and connected to the accumulator and the first chamber, the first control valve in flow communication with the hose burst valve and the first chamber, the first control valve movable between a first position in which hydraulic fluid flow is permitted in only a single direction from the accumulator to the first chamber and a second position in which hydraulic fluid flow is permitted between the accumulator and the first chamber in both directions;

a low pressure area;

a second control valve operatively connecting the second line to the low pressure area;

the first control valve, the second control valve, and the hose burst protection valve cooperating to provide a ride improving circuit having an active configuration and an inactive configuration, the ride improving circuit arranged to permit raising and lowering the loader arm while the ride improving circuit is in the active configuration and when in the inactive configuration;

the second control valve arranged to prevent flow from the second line to the low pressure area when the ride improving circuit is in the inactive configuration;

the ride improving circuit arranged to permit raising the loader arm in the active configuration by shifting each of the first and second control valves to the second position with the relief valve biased toward the first position; and the ride improving circuit further arranged to permit lowering the loader arm in the active configuration achieved by shifting the first control valve to the second position in the second control valve to the first position, the relief valve shiftable toward the second position in response to pressure increases in the second line.

14. A ride improving hydraulic circuit for a loader arm of a loader and having hose burst protection, the hydraulic circuit comprising:

a hydraulic cylinder operatively connected to the loader arm for raising and lowering the loader arm, the hydraulic cylinder having a first chamber and a second chamber disposed on opposite sides of a piston;

a selection valve operatively connected to the hydraulic cylinder via a first line and a second line, the selection valve arranged to feed pressurized hydraulic fluid to the first chamber via the first line and to receive hydraulic fluid at a lower pressure from the second chamber via the second line in order to raise the loader arm, the selection valve further arranged to feed pressurized hydraulic fluid to the second chamber via the second line and to receive hydraulic fluid at a lower pressure from the first chamber via the first line in order to lower the loader arm;

a hose burst check valve mounted to the hydraulic cylinder and coupled to the first line at a first point and a second point, the hose burst check valve operatively coupled to the first chamber, the hose burst check valve arranged to prevent fluid under pressure from passing from the first chamber toward the selection valve but permitting fluid under pressure to flow from the selection valve toward the first chamber;

a relief valve disposed in the first line between the first point and the second point, the relief valve shiftable from a first position to a second position in response to pressure changes in the second line, the first position arranged to prevent fluid flow between the selection valve and the first chamber in both directions, the second position arranged to permit fluid flow from the first chamber toward the selection valve, the relief valve arranged to shift to the second position in response to a pressure increase in the second chamber;

an accumulator operatively coupled to the hydraulic cylinder;

a low pressure area;

a control valve operatively connecting the second line to the low pressure area, the control valve movable between a first position in which hydraulic fluid flow between the second line and the low pressure area is prevented in at least one direction and a second position in which hydraulic fluid flow between the second feed line and the low pressure area is permitted in both directions;

the control valve and the hose burst protection valve cooperating to provide a ride improving circuit having an active and inactive configuration, the ride improving circuit arranged to permit raising and lowering the loader arm while the ride improving circuit is active and when the ride improving circuit is inactive;

the active configuration arranged to permit raising the loader arm upon shifting the control valve to the second position with the relief valve in the first position; and the active configuration further arranged to permit lowering the loader arm upon shifting the control valve to the first position and with the relief valve shifted toward the second position in response to pressure increases in the second line.

* * * * *

UNITED STATES PATENT AND TRADEMARK OFFICE

CERTIFICATE OF CORRECTION

PATENT NO. : 7,089,734 B2
APPLICATION NO. : 09/866311
DATED : August 15, 2006
INVENTOR(S) : David A. Cook et al.

It is certified that error appears in the above-identified patent and that said Letters Patent is hereby corrected as shown below:

On the First Page:

In the Declaration, 1st Inventor, PTO error, “Staffordshire” should be -- Cheadle --.

In the Assignment, page 1, line 7, Applicant error, “Staffordhire” should be -- Rocester, Uttoxeter --.

In the Abstract, line 7, PTO error, “Hydraulic” should be -- hydraulic --.

In the Claims:

In the Amendment dated May 17, 2004, page 3, Claim 1, line 15 of that page, Applicant error, “to a pressure” should be -- to pressure --.

In the Amendment dated May 17, 2004, page 5, Claim 7, line 24 of that page, PTO error, “the-second” should be -- the second --.

In the Amendment dated May 17, 2004, page 10, Claim 15, line 14 of that page, PTO error, “accumulator,” should be -- accumulator --.

In the Amendment dated May 17, 2004, page 11, Claim 16, line 1, PTO error, “operatively,” should be -- operatively --.

Signed and Sealed this

Seventeenth Day of June, 2008

JON W. DUDAS
*Director of the United States Patent and Trademark Office*

UNITED STATES PATENT AND TRADEMARK OFFICE

CERTIFICATE OF CORRECTION

PATENT NO. : 7,089,734 B2
APPLICATION NO. : 09/866311
DATED : August 15, 2006
INVENTOR(S) : David A. Cook et al.

It is certified that error appears in the above-identified patent and that said Letters Patent is hereby corrected as shown below:

On the First Page:

Item (75), 1st Inventor, “Staffordshire” should be -- Cheadle --.

Item (73), “Staffordhire” should be -- Rocester, Uttoxeter --.

Item (57), In the Abstract, line 7, “Hydraulic” should be -- hydraulic --.

In the Claims:

Column 5, Claim 1, line 37, “to a pressure” should be -- to pressure --.

Column 6, Claim 7, line 54, “the-second” should be -- the second --.

Column 9, Claim 11, line 33, “accumulator,” should be -- accumulator --.

Column 10, Claim 12, line 2, “operatively,” should be -- operatively --.

This certificate supersedes the Certificate of Correction issued June 17, 2008.

Signed and Sealed this

Fifteenth Day of July, 2008

Jon W. Dudas

JON W. DUDAS
*Director of the United States Patent and Trademark Office*